United States Patent [19]

Negrin et al.

[11] Patent Number: 5,642,280

[45] Date of Patent: Jun. 24, 1997

[54] METHOD AND SYSTEM FOR DETERMINING AND COMPENSATING FOR A FAULTY WHEEL SPEED INPUT SIGNAL IN A VEHICLE CONTROL SYSTEM

[75] Inventors: Dan Negrin, Wiesbaden, Germany; Jan van Deventer, Ann Arbor, Mich.

[73] Assignee: Kelsey-Hayes Company, Livonia, Mich.

[21] Appl. No.: 383,258

[22] Filed: Feb. 3, 1995

[51] Int. Cl.$^6$ .................................................. G06F 17/00
[52] U.S. Cl. ............................. 364/423.098; 364/424.039; 364/424.045; 73/510; 324/161
[58] Field of Search ........................ 364/424.01, 424.05, 364/426.01, 426.02, 426.03, 565, 566, 423.098, 424.034, 424.039, 424.045; 73/488, 507, 510; 324/160, 161

[56] References Cited

U.S. PATENT DOCUMENTS

| | | | |
|---|---|---|---|
| 4,720,794 | 1/1988 | Skarvada | 364/426.02 |
| 4,811,232 | 3/1989 | Hoashi et al. | 364/426.02 |
| 5,193,886 | 3/1993 | Gloceri | 303/92 |
| 5,404,304 | 4/1995 | Wise et al. | 364/426.04 |
| 5,406,485 | 4/1995 | Wise et al. | 364/426.02 |
| 5,436,836 | 7/1995 | Holtz et al. | 364/426.02 |
| 5,485,379 | 1/1996 | Kremer | 364/426.02 |

*Primary Examiner*—Collin W. Park
*Attorney, Agent, or Firm*—MacMillan, Sobanski and Todd

[57] ABSTRACT

Method and system are provided for "filtering out" a faulty wheel speed input signal in a vehicle control system, such as an ABS and/or TC system in order to ensure that the faulty wheel speed input signal does not contaminate or corrupt wheel speed information contained in the other wheel speed input signals. If such faulty wheel speed input signal indicates an abnormally high speed, it will increase the other wheel speed information if undetected. The wheel speed information is essential in detecting wheel instability or slip. It is important that wheel speed is not over-estimated since this may result in false slip detection and false ABS activation. Over-estimation of the vehicle speed would occur if the information from a spinning wheel is not properly filtered or compensated for. In one embodiment of the present invention, a bad sensor is detected by detecting and compensating for a single outlying ramp (outlier) of wheel speed. In a second embodiment of the present invention, an erratic sensor is detected and compensated for in the control system.

12 Claims, 3 Drawing Sheets

METHOD AND SYSTEM FOR DETERMINING AND COMPENSATING FOR A FAULTY WHEEL SPEED INPUT SIGNAL IN A VEHICLE CONTROL SYSTEM

TECHNICAL FIELD

This invention relates to methods and systems for determining and compensating for faulty wheel speed input signals and, in particular, to methods and systems for determining and compensating for a faulty wheel speed input signal in a vehicle control system such as an electro-hydraulic control system.

BACKGROUND ART

In an effort to meet the increasing demands of vehicle operators and occupants, vehicle manufacturers and their suppliers are increasingly designing and manufacturing vehicles with additional and improved vehicle stability management (VSM) features. One such VSM feature that has been incorporated into a number of vehicle types is anti-lock braking, which can take a variety of forms. Another such feature is traction control (i.e., TC).

Vehicle anti-lock brake systems are designed to maximize the ability of a vehicle operator to bring a vehicle to a controlled stop on any type of road surface. The system accomplishes this goal by preventing the vehicle brakes from prematurely halting vehicle wheel rotation, or "lecking" the vehicle wheels, regardless of the road surface and the pressure applied to the brake pedal by the vehicle operator.

Typical vehicle anti-lock brake systems (i.e. ABS) include vehicle wheel speed sensors for providing inputs to an anti-lock brake system control unit. The control unit controls anti-lock brake system control valves interposed between the brake master cylinder and the individual wheel brakes of a hydraulic brake circuit. Such control valves include isolation valves and dump valves. The control valves, in turn, regulate hydraulic brake fluid pressure in the individual wheel brakes to implement anti-lock braking. ABS pump(s) pumps fluid from accumulator(s) to the various control valves.

In operation, one or more of the vehicle wheel speed sensors provides input to the control unit for subsequent determination of not only wheel speed but also the vehicle speed. The control unit monitors the vehicle and vehicle wheel speeds for an indication of an anti-lock braking event. First, based upon the vehicle speed, the control unit typically determines a slip threshold. Using the vehicle velocity as a reference, slip threshold may be expressed as the difference between a selected velocity and the vehicle velocity.

In most ABS and/or TC control systems, wheel speed sensor continuity is self-tested by the ABS and/or TC microcontroller. Some systems measure the bias voltage which reflects the sensor resistance while others simply flip-flop the input circuit with a test pulse. However, these systems do not solve the problem where the sensor generates an incorrect number of analogic pulses which, in turn, are converted to a digital pulse train having a corresponding incorrect number of digital pulses. In this situation, the sensor may be bad, incorrectly installed, or may have come loose.

SUMMARY OF THE INVENTION

An object of the present invention is to provide a method and system to determine and compensate for a faulty wheel speed input signal in a vehicle control system.

Another object of the present invention is to provide a method and system to determine and compensate for a faulty wheel speed input signal in an electro-hydraulic control system so that data appearing on one channel of the system does not contaminate the data appearing on the other channels of the system.

In carrying out the above objects and other objects of the present invention, a method for determining and compensating for a faulty wheel speed input signal in a vehicle control system is provided. The method includes the steps of: a) generating wheel speed input signals based on the rotary speed of a corresponding number of wheels of the vehicle; b) computing a corresponding wheel speed based on each wheel speed input signal; and c) defining a window of acceptable wheel speeds based on the computed wheel speeds. The method further includes the steps of: d) determining if one of the computed wheel speeds lies outside the window of acceptable wheel speeds; and repeating steps a) through d) for a predetermined number of consecutive time periods; and, if the one of the computed wheel speeds lies outside of the window of acceptable wheel speeds for each of the predetermined number of consecutive time periods, then processing the computed wheel speeds together, except for the one of the computed wheel speeds which lies outside the window to obtain at least one resultant signal. Finally, the method includes the step of utilizing the at least one resultant signal in the vehicle control system to control the vehicle.

Preferably, the one of the computed wheel speeds is a single computed wheel speed and the single computed wheel speed is greater than the other computed wheel speeds.

Still further in carrying out the above object and other objects of the present invention, a method is provided for determining and compensating for a faulty wheel speed input signal in a vehicle control system. The method includes the steps of: utilizing the wheel speed sensors to generate consecutive wheel speed input signals for each wheel based on the rotary speed of each wheel; computing first and second wheel speeds corresponding to the consecutive wheel speed input signals for each wheel. The method further includes the steps of determining a difference between the first and second computed wheel speeds for each wheel and dividing the difference for each wheel by a predetermined time period to obtain a corresponding acceleration for each wheel; and comparing the acceleration for each wheel with a predetermined acceleration. The method finally includes the steps of classifying a wheel speed sensor as being erratic if its corresponding acceleration is greater than the predetermined acceleration; and ignoring the wheel speed input signal generated by the erratic wheel speed sensor in the vehicle control system.

Still further in carrying out the above objects and other objects of the present invention, systems are provided for carrying out the above method steps.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
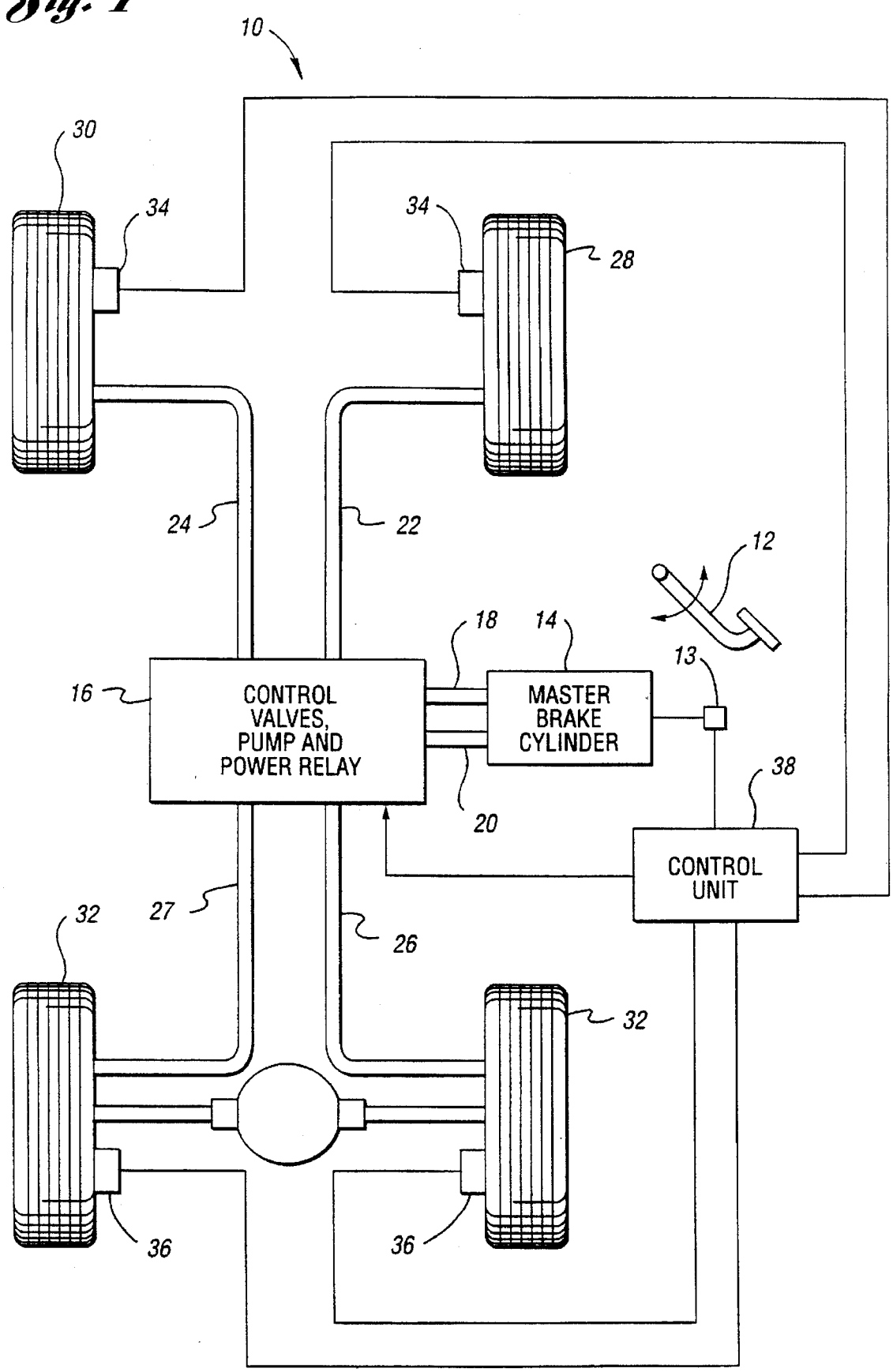
FIG. 1 is a schematic diagram of an automatic vehicle and an interconnected vehicle control system such as an ABS and/or TC system.

Referring now to FIG. 1, a schematic diagram of a motor vehicle denoted generally by reference numeral 10, in conjunction with a vehicle control system such as a passenger vehicle anti-lock brake system (ABS) and/or traction control (TC) system (i.e., ABS or TC system or both) is shown. The vehicle 10 and system include a brake pedal 12, a brake switch 13, a brake master cylinder 14, control valves, pump and power relay collectively indicated at 16, brake fluid conduits 18, 20, 22, 24 and 26, as well as a right front wheel 28, a left front wheel 30, and a pair of rear wheels 32.

The ABS and/or TC system includes a pair of wheel speed sensor input circuits 34 for generating a wheel speed input signal representative of the velocity of each of the front wheels 28 and 30, and a pair of wheel speed sensor input circuits 36 for generating a wheel speed input signal representative of the velocity of each of the rear wheels 32. The system further includes an ABS control unit 38. Each of the input circuits 34 and 36 are operatively connected or coupled to the control unit 38. Such operative connections are preferably electrical, but may also be other types of connections, such as fiber optic.

The control unit 38 includes a commercially available microcontroller. Once programmed, the control unit 38 functions as a control means for activating the ABS.

Each wheel speed sensor of its associated input circuit 34 or 36 may comprise a stationary variable reluctance sensor positioned adjacent a toothed wheel (not shown) which rotates with its respective vehicle wheel 28, 30, or 32. Each sensor provides a series of analog pulses, the frequency of which is proportional to the speed or velocity of its corresponding wheel. The analog output of each speed sensor is converted into a digital pulse train by an ASIC which preferably includes a comparator circuit, one input of which is grounded. The input circuits 34 and 36 each generate a pulsed digital signal whose frequency varies directly with the speed of the respective vehicle wheels 28, 30, 32. Other well known wheel speed sensor configurations may also be employed.

Figure 2A:
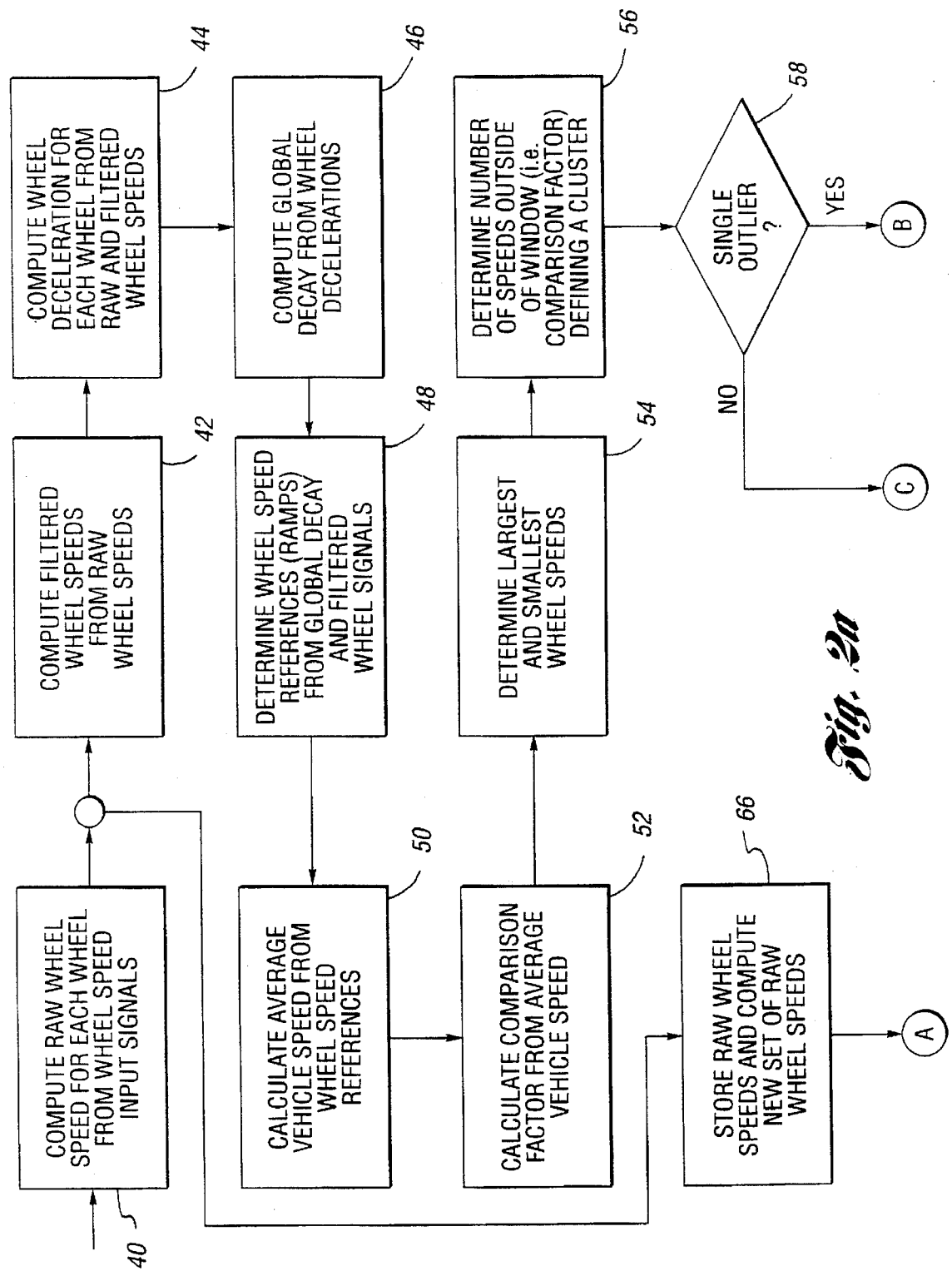
FIGS. 2a and 2b is a block diagram flow chart illustrating control logic of methods and systems of the present invention for determining and compensating for a faulty wheel speed input signal generated by the ABS and/or TC system.

Referring now to FIG. 2a, there is illustrated a block diagram flow chart of algorithms utilized by the control unit 38, which both determine and compensate for faulty wheel speed input signals coming from one or more of the input circuits 34 and 36.

At block 40, raw wheel speed is computed for each wheel from wheel speed input signals which are generated by the input circuits 34 and 36. Preferably, both the rising and falling edges of the digital wheel speed input signals are detected and serviced for use in the calculation of wheel speeds. In other words, transitions (state changes) of the square wave are identified as interrupts and are used to calculate wheel speeds. Typically, a sensor interrupt routine stores the time of the interrupt and also keeps time of the previous interrupt for that particular circuit. For every loop, the algorithm calculates the average of the two most recent interrupts and stores its value. This value, which can be called the mean edge time, is used for calculations of the period (i.e. the time interval over which the sensor pulses were received). During every program loop, the wheel speed is calculated by dividing the number of interrupts by the difference between the mean edge time and the mean edge time calculated in the previous loop and scaling appropriately. In this way, wheel speed is obtained for each of the wheels.

At block 42, filtered wheel speed is computed based on the raw wheel speed for each of the wheels. This filtering is accomplished by low pass filtering the raw wheel speed to reduce spurious noise.

At block 44, wheel deceleration is computed for each wheel from the raw and filtered wheel signals. In particular, wheel deceleration is computed with a digital filter from the difference between the filtered wheel speed and the raw wheel speed for each channel.

At block 46, a global decay is computed from the wheel decelerations. This decay value is determined and insures that each wheel speed reference (noted below) is modified in such a manner as to optimize vehicle braking under ABS control. Preferably, the decay is initially set at a default value slightly greater than a maximum attainable vehicle deceleration (for example, 1.0 g). If the filtered wheel speed is less than the reference value, then the reference value will be decayed. If the filtered wheel speed is greater than the reference value, then the reference will be adjusted upward. The global decay value is calculated from the deceleration of the wheels which is the estimated vehicle deceleration.

At block 48, wheel speed references (ramps) are determined from the global decay and the filtered wheel speeds. Wheel speed references are provided for each ABS channel. The wheel speed references are decayed as noted above so as to ensure maximum braking efficiency while providing a reference for slip detection.

At block 50, average vehicle speed is calculated from the wheel speed references. This calculation is performed every loop so that the wheel speed references for each of the control channels are used to calculate the average vehicle speed.

At block 52, a comparison factor (i.e. Comfac) is calculated as a small percentage of the average vehicle speed (i.e. typically 7–9%). In general, the wheel speed references are compared every program loop and are only allowed to differ by the calculated comparison factor.

At block 54, the largest and smallest wheel speeds are determined for every loop.

At block 56, the number of wheel speeds outside of the window defined by the comparison factor is determined. The speeds inside the window define a cluster and any speed outside of the cluster defines an outlier.

Figure 2B:
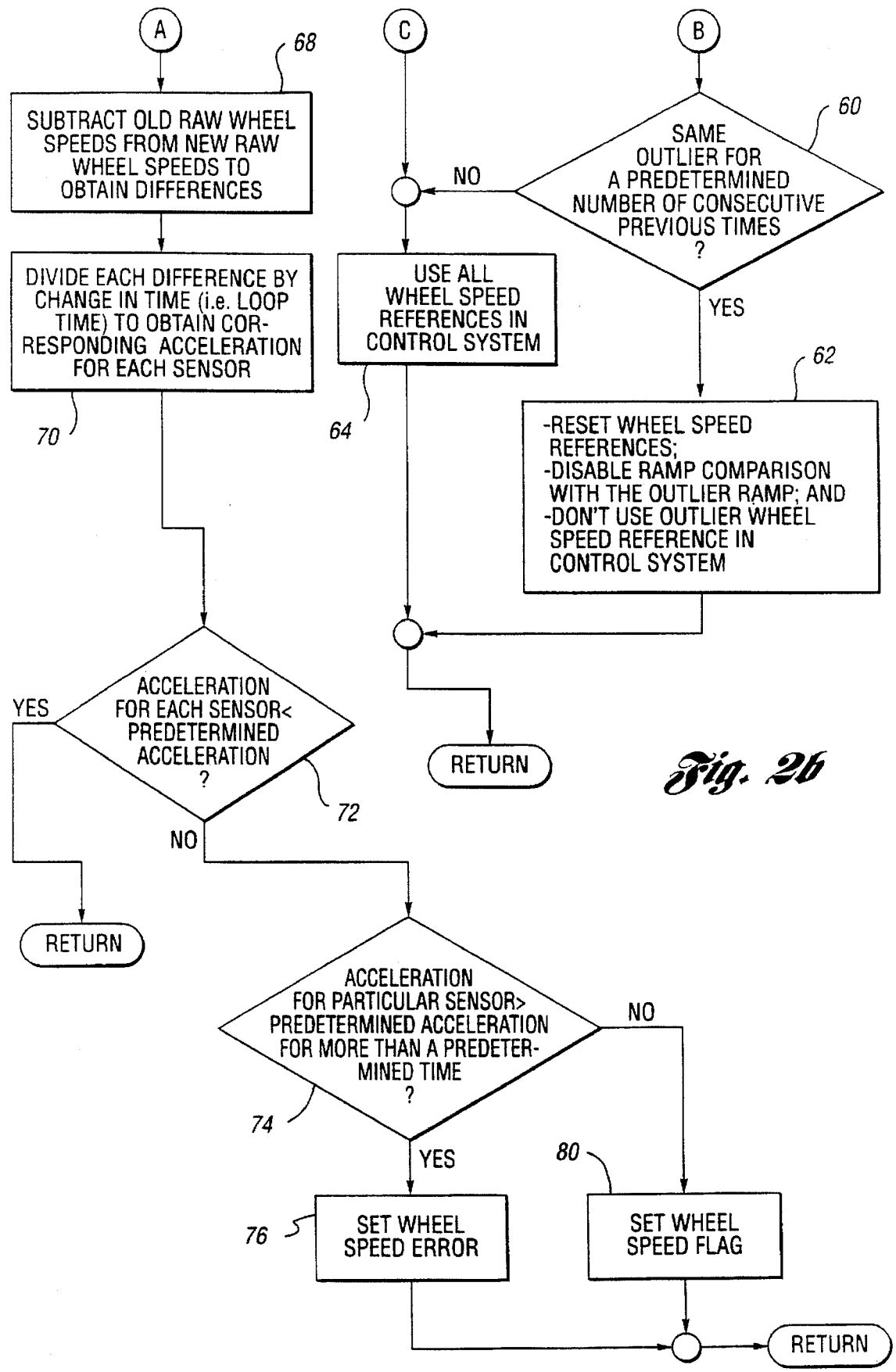

At block 58 in FIG. 2b, it is determined whether there is a single outlier or multiple outliers.

At block 60, if there is a single outlier, it is determined whether the same outlier is present for a predetermined number of consecutive time periods (i.e. for a predetermined number of consecutive program loops).

At block 62, if there is a single outlier and the same outlier is present for a predetermined number of consecutive time periods, a number of actions are taken. For example, the wheel speed references are reset to their values determined by their normal ramp computations. Also, ramp comparison is disabled with the outlier ramp and the outlier wheel speed reference is not further utilized in the control system.

With respect to the disabling of the ramp comparison with the outlier ramp, typically the front wheel speed references are compared to each other and then each individual front wheel speed reference is compared to a common rear wheel speed reference (one wheel speed reference is used for the rear in both three and four sensor systems). When the front wheel speed references are compared, if their difference is greater than Comfac, then the lower wheel speed reference is increased to allow a difference of no more than Comfac.

When the left front wheel speed reference is compared to the rear wheel speed reference, the lower wheel speed reference is adjusted upward if necessary. Then the right front wheel speed reference is compared to the rear wheel speed reference and the low wheel speed reference is adjusted upward if necessary.

The Comfac value can be considered to be the allowable wheel speed difference due to differing wheel speeds when the vehicle is in a turning maneuver. However, as previously mentioned, if the results of blocks 58 and 60 are "yes", then the outlier ramp is not utilized in comparisons with other ramps. Typically, Comfac is a small percentage, such as 8% of estimated vehicle speed which is calculated from the wheel speed references as previously mentioned.

At block 64, all of the wheel speed references are utilized in the control system, are compared to one another and are used to calculate other quantities used by the control system, such as vehicle acceleration and deceleration. The wheel speed reference values represent an estimation of the vehicle speed at a particular wheel axis.

As previously mentioned, the values are essential in detecting wheel instability or slip. It is important that the values are not over-estimated, since this may result in false slip detection and false ABS activation. Over-estimation of the vehicle speed would occur if information from a spinning wheel (i.e. a wheel moving faster than the vehicle as from excess engine torque) was not filtered or compensated for.

Referring to FIGS. 2a and 2b, at block 66 through block 80, there is indicated an algorithm for determining if a wheel speed input signal and its associated sensor are "erratic."

At block 66 in FIG. 2a, raw wheel speeds computed at block 40 are temporarily stored and a new set of raw speed signals are computed during the next program loop for each wheel.

At block 68 in FIG. 2b, the old raw wheel speeds are subtracted from the new raw wheel speeds to obtain a difference in the raw wheel speeds for each wheel.

At block 70, each difference in raw wheel speeds is divided by a predetermined change in time, such as one program loop time, to obtain a corresponding acceleration for each wheel.

At block 72, acceleration for each wheel is compared with a first predetermined maximum acceleration, such as 50 g. If the acceleration is less than the first predetermined maximum acceleration, then program control is returned to the main program with the understanding that the acceleration is not so high as to indicate an "erratic" sensor.

At block 74, if acceleration for a particular wheel is greater than the first predetermined acceleration, then this condition is tested to see if the acceleration has been greater than the predetermined acceleration for a predetermined time such as 20 milliseconds. If "yes", a wheel speed error flag is set at block 76 which indicates a serious error has occurred with respect to the generation of a particular wheel speed input signal. Typically, the ABS is shut down.

At block 80, if "no", a wheel speed flag is set and the control unit senses this and then resets the flag. After a predetermined number of wheel speed flags have been set and reset (which the control unit keeps track of) and block 74 is again entered, then the block 74 will provide a "yes" answer. A predetermined number of flag sets and resets (such as 4) corresponds to the predetermined time.

The algorithm of blocks 66 through 80, noted above, prevents over-estimation of vehicle reference speeds based on the premise that there is a limit to the acceleration that a particular vehicle wheel can obtain. The speed references (being estimates of vehicle speed) should also be limited to this rate of change. Taken further, a significant difference between actual wheel speed and its vehicle speed reference is a good indicator that a spin-up is in progress and a tighter acceleration limit may be appropriate.

While the best mode for carrying out the invention has been described in detail, those familiar with the art to which this invention relates will recognize various alternative designs and embodiments for practicing the invention as defined by the following claims.

What is claimed is:

1. A method for determining and compensating for a faulty vehicle wheel speed input signal in a vehicle control system, the method comprising the steps of:

(a) generating wheel speed input signals based on the rotary speed of a corresponding number of wheels of the vehicle;

(b) computing a corresponding wheel speed based on each wheel speed input signal;

(c) defining a window of acceptable wheel speeds based on the computed wheel speeds;

(d) determining if the computed wheel speed of one of the wheels lies outside the window of acceptable wheel speeds;

repeating steps (a) through (d) for a predetermined number of consecutive time periods; and if the computed wheel speed of the one of the wheels lies outside of the window of acceptable wheel speeds for each of the predetermined number of consecutive time periods, then processing the computed wheel speeds of the other wheels together, excluding the computed wheel speed of the one of the wheels which lies outside the window, to obtain at least one resultant signal; and utilizing the at least one resultant signal in the vehicle control system to control the vehicle.

2. The method as claimed in claim 1 wherein the computed wheel speed of the one of the wheels is a single computed wheel speed.

3. The method as claimed in claim 1 wherein the computed wheel speed of the one of the wheels is greater than the computed wheel speeds of the other wheels.

4. The method as claimed in claim 3 wherein the step of defining includes the step of calculating a size of the window based on the calculated wheel speeds.

5. The method as claimed in claim 1 wherein the at least one resultant signal is a vehicle speed signal.

6. The method as claimed in claim 1 wherein the at least one resultant signal is a vehicle acceleration signal.

7. A system for determining and compensating for a faulty wheel speed input signal in a vehicle control system, the system comprising:

means for generating wheel speed input signals based on the rotary speed of a corresponding number of wheels of the vehicle; and a control unit for:

computing a corresponding wheel speed based on each wheel speed input signal;

defining a window of acceptable wheel speeds based on the computed wheel speeds;

determining if the computed wheel speed of one of the wheels lies outside the window of acceptable wheel speeds; and, if the computed wheel speed of the one of the wheels lies outside of the window of acceptable wheel speeds for each of the predetermined number of consecutive time periods, processing the computed wheel speeds of the other wheels together excluding the computed wheel speed of the one of the wheels which lies outside of the window to obtain at least one resultant signal; and utilizing the at least one resultant signal in the vehicle control system to control the vehicle.

8. The system as claimed in claim 7 wherein the computed wheel speed of the one of the wheels is a single computed wheel speed.

9. The system as claimed in claim 7 wherein the computed wheel speed of the one of the wheels is greater than the computed wheel speeds of all the other wheels.

10. The system as claimed in claim 9 wherein the control unit calculates a size of the window based on the calculated wheel speeds.

11. The system as claimed in claim 7 wherein the at least one resultant signal is a vehicle speed signal.

12. The system as claimed in claim 7 wherein the at least one resultant signal is a vehicle acceleration signal.

* * * * *